United States Patent
Peters et al.

(10) Patent No.: US 12,247,929 B2
(45) Date of Patent: Mar. 11, 2025

(54) APPARATUS AND METHOD FOR INSPECTING TECHNICAL DEVICES USING A BORESCOPE

(71) Applicant: Lufthansa Technik AG, Hamburg (DE)

(72) Inventors: Jan Oke Peters, Hamburg (DE); Michael Thies, Hamburg (DE); Thorsten Schueppstuhl, Hamburg (DE); Lukas Bath, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 105 days.

(21) Appl. No.: 17/910,356

(22) PCT Filed: Mar. 9, 2021

(86) PCT No.: PCT/EP2021/055882
§ 371 (c)(1),
(2) Date: Sep. 9, 2022

(87) PCT Pub. No.: WO2021/180698
PCT Pub. Date: Sep. 16, 2021

(65) Prior Publication Data
US 2023/0121496 A1 Apr. 20, 2023

(30) Foreign Application Priority Data
Mar. 10, 2020 (DE) ...................... 10 2020 106 509.4

(51) Int. Cl.
*G01N 21/954* (2006.01)
*B25J 9/16* (2006.01)
(Continued)

(52) U.S. Cl.
CPC .......... *G01N 21/954* (2013.01); *B25J 9/1697* (2013.01); *B25J 17/0283* (2013.01);
(Continued)

(58) Field of Classification Search
CPC . B25J 9/1697; B25J 17/0283; G01N 35/0099; G01N 21/954; G01N 2021/9542; G02B 23/2476; H04N 23/555
See application file for complete search history.

(56) References Cited

U.S. PATENT DOCUMENTS 3,778,170 A * 12/1973 Howell ............. G02B 23/2476
600/114
4,298,312 A * 11/1981 MacKenzie .......... F01D 21/003
385/119
(Continued)

FOREIGN PATENT DOCUMENTS

DE 20003207 U1 5/2000
DE 102016110536 A1 1/2017
WO WO 2008036148 A2 3/2008

*Primary Examiner* — Sang H Nguyen
(74) *Attorney, Agent, or Firm* — LEYDIG, VOIT & MAYER, LTD.

(57) ABSTRACT

An apparatus is used for inspecting a technical device using a borescope. The apparatus has a repeatedly plastically deformable and elongated carrier which is guidable in a deforming unit. The deforming unit has a stationary guide configured to axially guide the carrier at an outlet end and an actuator which is designed to axially guide the carrier and can be moved in at least one direction perpendicular to the gap between the guide and the actuator in order selectively to apply a bending moment to the carrier guided by the guide and the actuator. A borescope head is arranged at that end of the carrier which protrudes from the outlet end of the deforming unit.

17 Claims, 4 Drawing Sheets

(51) Int. Cl.
   *B25J 17/02* (2006.01)
   *G01N 33/00* (2006.01)
   *G01N 35/00* (2006.01)
   *H04N 23/50* (2023.01)

(52) U.S. Cl.
   CPC ....... *G01N 35/0099* (2013.01); *H04N 23/555* (2023.01); *G01N 2021/9542* (2013.01)

(56) References Cited

U.S. PATENT DOCUMENTS

| | | | | |
|---|---|---|---|---|
| 4,790,624 | A | * | 12/1988 | Van Hoye ................ B25J 18/06 |
| | | | | 600/151 |
| 5,096,292 | A | * | 3/1992 | Sakamoto ............ A61B 1/0051 |
| | | | | 356/241.4 |
| 5,644,394 | A | * | 7/1997 | Owens .................... F01D 5/005 |
| | | | | 356/241.5 |
| 7,271,894 | B2 | | 9/2007 | Devitt et al. |
| 2009/0225159 | A1 | * | 9/2009 | Schneider ............ A61B 1/0005 |
| | | | | 348/82 |
| 2017/0072557 | A1 | | 3/2017 | Troy et al. |
| 2017/0219814 | A1 | * | 8/2017 | Letter ................... G01M 15/14 |
| 2019/0145905 | A1 | | 5/2019 | Sibbach |
| 2020/0319119 | A1 | * | 10/2020 | Peters ................ G02B 23/2476 |
| 2021/0137623 | A1 | * | 5/2021 | Yen ........................ A61B 34/74 |
| 2021/0231530 | A1 | * | 7/2021 | Fuke .................... G01N 21/954 |

\* cited by examiner

APPARATUS AND METHOD FOR INSPECTING TECHNICAL DEVICES USING A BORESCOPE

CROSS REFERENCE TO RELATED APPLICATIONS

This application is a U.S. National Phase application under 35 U.S.C. § 371 of International Application No. PCT/EP2021/055882, filed on Mar. 9, 2021, and claims benefit to German Patent Application No. DE 10 2020 106 509.4, filed on Mar. 10, 2020. The International Application was published in German on Sep. 16, 2021 as WO 2021/180698 A1 under PCT Article 21(2).

FIELD

The present disclosure relates to an apparatus and a method for inspecting technical devices using a borescope.

BACKGROUND

Borescopes are used to inspect technical devices in regions which cannot be viewed directly. The borescopes can be introduced into the regions in question through small openings and provide a glimpse into regions which cannot otherwise be viewed either directly via an optical system or alternatively by displaying a video image (also referred to as a video borescope) recorded by an appropriate sensor system at the borescope tip.

Borescopes are used, for example, when inspecting aircraft engines in order to see inside the engine without the effort of having to dismantle it. It is here necessary or at least desirable to thoroughly assess and document the region, at least for individual regions of the aircraft engine such as, for example, the combustion chamber.

To inspect the inside of the combustion chamber, use is currently made of a video borescope with a flexible shaft which can be guided manually through the combustion chamber. To do this, the flexible borescope is guided along the complete inner circumference of the combustion chamber and then slowly withdrawn. The images captured by the borescope are recorded during the withdrawal. Attempts are made here to ensure that the complete circumference of the usually annular combustion chamber is captured. If a potential problem location in the combustion chamber is thus identified, manual 3D capturing of the corresponding location using special three-dimensional (3D) borescopes suitable for this purpose is carried out.

Because the borescope with a flexible shaft is guided manually, complete and reproducible documentation of the condition of a combustion chamber is, however, rarely possible. Moreover, in particular the subsequent 3D capturing of potential problem locations is very expensive and time-consuming.

SUMMARY

In an embodiment, the present disclosure provides an apparatus for inspecting a technical device using a borescope. The apparatus has a repeatedly plastically deformable and elongated carrier which is guidable in a deforming unit. The deforming unit has a stationary guide configured to axially guide the carrier at an outlet end and an actuator which is designed to axially guide the carrier and can be moved in at least one direction perpendicular to the gap between the guide and the actuator in order selectively to apply a bending moment to the carrier guided by the guide and the actuator. A borescope head is arranged at that end of the carrier which protrudes from the outlet end of the deforming unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present disclosure provides an apparatus and a method by means of which the inspection of technical devices using a borescope can be improved.

The present disclosure relates to an apparatus for inspecting technical devices using a borescope, comprising a repeatedly plastically deformable and elongated carrier element which is guided in a deforming unit, wherein the deforming unit comprises a stationary guide element for axially guiding the carrier element at an outlet end and an actuator element which is designed to axially guide the carrier element and can be moved in at least one direction perpendicular to the gap between the guide element and the actuator element in order selectively to apply a bending moment to the carrier element guided by the guide element and the actuator element, and wherein a borescope head is arranged at that end of the carrier element which protrudes from the outlet end of the deforming unit.

The present disclosure furthermore relates to a method for inspecting technical devices using a borescope, preferably with the use of an apparatus according to an aspect of the present disclosure, wherein a repeatedly plastically deformable and elongated carrier element with a borescope head is selectively pre-deformed, during insertion into the technical device, at its end which is to be inserted into the technical device in the region before entry into the technical device, in order thus to follow a predetermined path of the borescope head inside the technical device.

Some terms used in connection with the present disclosure will first be explained.

An elongated carrier element is "repeatedly plastically deformable" if, when deformed, the carrier element displays no or hardly any signs of fatigue and essentially (i.e. in particular apart from elastic components of the deformation) retains a shape achieved by deformation. The carrier element can preferably be deformed for multiple cycles, for example at least for at least 20 cycles, more preferably for at least 50 cycles, as part of the deformations to be expected during use of the apparatus according to the present disclosure, without there being any noticeable signs of fatigue.

A plastically deformable "carrier element" is a carrier element which, when used properly, not only is self-supporting but also can carry those loads for which it is intended without deforming independently, at least plastically, under gravity.

In the present case, "axial guidance" refers to guidance of the elongated carrier element which permits movement of the carrier element in its axial direction but prohibits movement in the radial direction of the carrier element. The angular situation of the axis of the carrier element as part of the guidance and/or a rotational movement of the carrier element about its own axis are thus fundamentally unrestricted or restricted only to wide angular ranges by the axial guidance. Depending on the use case of the apparatus according to the present disclosure or the design of the axial guidance, however, individual or all such angular modifications can also be prohibited.

The "borescope head" is that part of a borescope which ultimately determines the recording region of the borescope. In the case of a purely optical borescope, this corresponds, for example, to the borescope lens or the inlet surface of a light guide which defines the ultimate recording cone; in the case of a video borescope, this is the recording region of the image capture sensors provided for this purpose. It is irrelevant here whether 2D image capture within the visible range, recording within the non-visible range (for example, the infrared range), and/or the capture of 3D data, for example by triangulation, is effected via the borescope head. The borescope head can in principle be arranged on a rigid or flexible shaft. It is, however, also possible to arrange the borescope head without its own structural shaft on another element such as, for example, the carrier element.

The inventors have recognized that the inspection of technical devices such as, for example, gas turbines or aircraft engines, in particular complicated structures, using a borescope can be improved and is possible in particular in a reproducible fashion if the path followed by the borescope when pushed in can be influenced at least to a certain extent in an open and/or closed control loop. According to an aspect of the present disclosure, to do this it is provided that the borescope head is arranged at that end of a repeatedly plastically deformable, elongated carrier element which is ultimately to be introduced into the technical device to be inspected using a borescope, a deforming unit being provided for the controlled deformation of the carrier element when pushed into a technical device.

The deforming unit here comprises a guide element for axially guiding the carrier element. Because of the properties of the axial guidance within the sense of the present disclosure, it is ensured that the carrier element exits fundamentally at a defined location of the deforming unit. The apparatus according to an aspect of the present disclosure can thus be arranged relative to a technical device to be inspected using a borescope simply in such a way that the carrier element can be pushed into an opening, suitable for the introduction of a borescope, on the technical device.

In order to obtain deformation of the carrier element, the deforming unit comprises an actuator element through which the carrier element is likewise guided axially. Because the actuator element can be moved in at least one direction, preferably in any desired directions perpendicular to the gap between the guide element and the actuator element, a bending moment can be exerted selectively on the carrier element in order thus to deform it. In terms of the ability of the actuator element to move in a direction perpendicular to the gap between the guide element and the actuator element, required to apply a bending moment, it is irrelevant whether the actuator element can also move in a direction parallel to this gap or corresponding movements radially and axially with respect to the said axis are coupled together (for example, because the actuator element can move along a circular track or a race).

By applying a bending moment to the carrier element using the deforming unit, the deforming and hence, when the carrier element is correspondingly pushed through the deforming unit, the shaping of that part of the carrier element which protrudes from the guide element can be influenced and specified. The path taken by the borescope head at the end of the carrier element, for example inside a technical device, when pushed into or through the deforming unit can thus be preset.

It is preferred if, in addition to selectively applying a bending moment to the carrier element, the actuator element is designed to selectively apply a twisting moment to the carrier element. The same can be achieved, for example, in the case of non-rotational axial guidance of the carrier element or by corresponding selective fixing (see below) by swiveling the guide about the axis of the carrier element. In particular in the case of non-rotationally symmetrical carrier elements, additional modes of deformation can be achieved by selectively applying twisting moments.

The actuator element and/or the stationary guide element preferably comprises a controllable locking means for selectively fixing the position and/or the angular situation of the carrier element in the actuator element and/or the guide element. Depending on the design of the fixing, for example by effecting temporary fixed clamping, additional modes of deformation can be achieved by corresponding selective fixing. In the case of a suitable locking means on the guide element, it can also be prevented that temporary movements of the actuator element, for example to deform the carrier element, undesirably affect that end of the carrier element which protrudes from the apparatus. The locking means can be designed, for example, as a two-finger gripper for the carrier element.

It is particularly preferred if the actuator element can be moved in the direction of the gap between the stationary guide element and the actuator element. In addition to providing further modes of deformation, it is possible, in particular when locking devices are present both on the guide element and on the actuator element, to use the ability to move in the direction of the gap between the stationary guide element and the actuator element with alternating locking at the guide element and the actuator element to advance the carrier element segment by segment from the outlet end of the apparatus.

Alternatively or additionally thereto, it is possible that the guide element and/or the actuator element comprise guide rollers for the carrier element, some of the guide rollers preferably being driven. Advancing of the carrier element (optionally, also continuously) out of the outlet end can be achieved by suitably activating the roller drive or drives.

In order to achieve additional deformation and/or introduce the carrier element in a defined path into the technical device to be inspected using a borescope, a guide tube, protruding from the deforming unit, for the passage of the carrier element can be fastened on the guide element, wherein the guide tube is preferably detachable and hence fundamentally replaceable. Predetermined introduction of the carrier element inside the technical device to be inspected can be achieved reproducibly by a guide tube which may be specially configured for a technical device to be inspected using a borescope. Even if, depending on the design of the guide tube, there is ongoing deformation of the carrier element, the ultimate shaping of that part of the carrier element which protrudes from the guide tube can furthermore be influenced significantly by the deformation apparatus because the elastic part of the deformation by the guide tube is restored after it exits the guide tube to the shape of the carrier element which is achieved by the deforming apparatus. In the case of non-rotationally symmetrical carrier elements, the angular situation of the carrier element in the guide tube can also have an influence on the ultimate shaping.

It is preferred if a feed mechanism is provided by means of which the carrier element is fed in a defined manner to the actuator element on the side remote from the guide element, wherein the feed mechanism is fixed relative to the guide element or moved together with the actuator element. By virtue of a corresponding feed mechanism, increased accuracy in the deformation of the carrier element can regularly be achieved by movement of the actuator element because possible influences of an undefined feed on the ultimate deformation are excluded.

The carrier element can comprise a probe unit in the region of the borescope head for determining the position and/or orientation of the borescope head. It is possible to check via a corresponding probe unit whether the guide tube follows a predetermined path. The probe unit can be designed for determining the position using any known measurement principle, for example time-of-flight analysis of the radio or light signals emitted and/or received by the probe unit. Determining the position on the basis of image evaluation is also possible, for which purpose the probe unit comprises suitable image capture sensors. The probe unit can also be designed as integral with the borescope head.

The apparatus preferably comprises a control apparatus for control purposes. It is preferred here if the control is effected taking into account the positional and/or orientation information of the borescope head obtained via a probe unit or the borescope head. Using the corresponding positional and/or orientation information which can be calculated either by a probe unit or alternatively via the borescope head (for example, by image detection or evaluation of 3D data obtained), the actual situation and/or orientation can be compared with the predetermined path and, if a deviation is found, suitable countermeasures can be initiated.

The borescope head can be rigidly connected to the free end of the carrier element, it being possible to dispense with a separate borescope shaft. The "rigid connection" can here comprise the ability for selective detachment for maintenance purposes. The borescope head can, however, also be part of a flexible borescope which is guided through a suitable channel in the carrier element. In the case of the rigid connection to the carrier element, it is preferred if the connection has a degree of freedom of rotational movement about the axis of the carrier element and the swiveling of the borescope head about this axis can be controlled. In a suitable design of the swivelable connection, 360° panoramic recordings are possible. A corresponding rotation can, in the case of a flexible borescope pushed through the carrier element, be achieved by swiveling the borescope head. As an alternative thereto, it is preferably possible that the borescope head is designed to capture a 360° panoramic view. This can be achieved, for example, by a suitable number of image capture sensors arranged so that they are distributed radially.

The actuator element can comprise a preferably six-axis jointed-arm robot and/or a hexapod robot (Stewart platform), wherein the position and/or situation of the axial guidance of the actuator element can be modified by the robot. All the typically required deformations of the carrier element can be achieved using appropriate robots.

It is advantageous and therefore preferred if the guide tube is a material composite tube. The guide tube can here comprise a core made from a wound strip of metal, wherein the strip of metal is preferably an aluminum strip and/or is wound lengthwise. In order to preserve the dimensional stability of the guide tube after deformation, a plastic, preferably polyethylene covering of the core is furthermore preferably provided. A protective coating, preferably a protective film, can be provided on the side of the core situated opposite the covering such that in this case the core is surrounded completely by the covering and the protective coating. A smooth surface of the guide tube on its outer and inner side can regularly be achieved as a result. The risk of damage to a component of the technical device to be inspected using a borescope in the case of (unintentional) contact with the guide tube is furthermore reduced. Suitable tubes at the time of the priority date are available, for example, under the trade names "Dekabon" or under the "Synflex" brand of the Eaton Corporation, USA, and are described in detail, for example, in U.S. Pat. No. 4,216,802.

The borescope head can comprise an image capture unit as part of a video borescope. It can also be designed to capture 3D surface data, for example by triangulation on the basis of image data of two image capture units arranged adjacent to each other.

The technical devices to be inspected using a borescope can preferably be gas turbines and/or aircraft engines. Implementations embodying aspects of the present disclosure have been shown to be particularly suitable for inspecting precisely such technical devices using a borescope.

For explanation of the method according to the present disclosure, reference is made to the above embodiments relating to an apparatus designed to carry out this method. The advantageous developments of the apparatus which are described also directly provide advantageous developments of the method.

Figure 1:
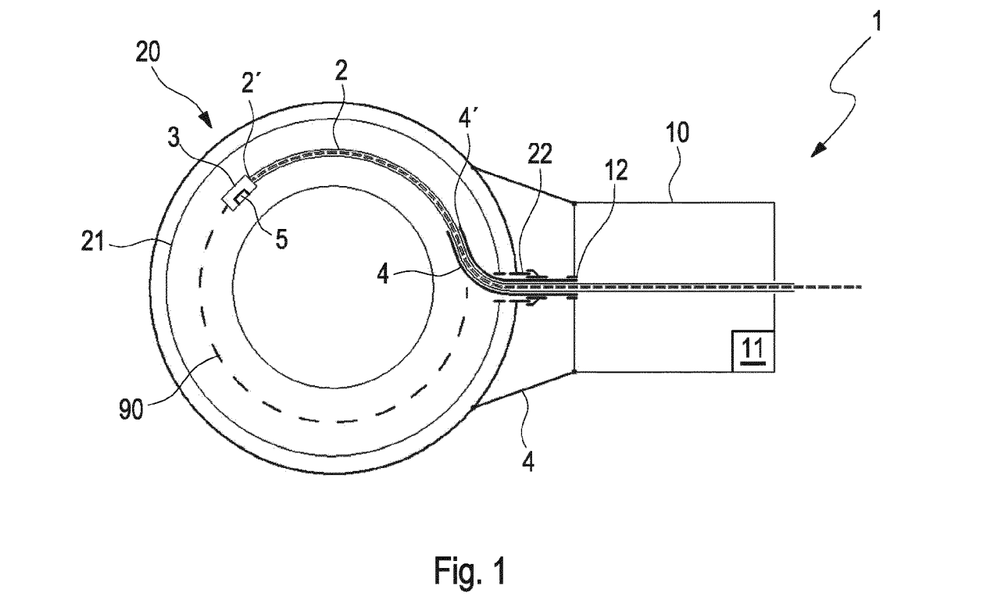
FIG. 1 shows a schematic illustration of the use of an apparatus according to an aspect of the present disclosure for inspecting a combustion chamber of an aircraft engine using a borescope.
Figure 2:
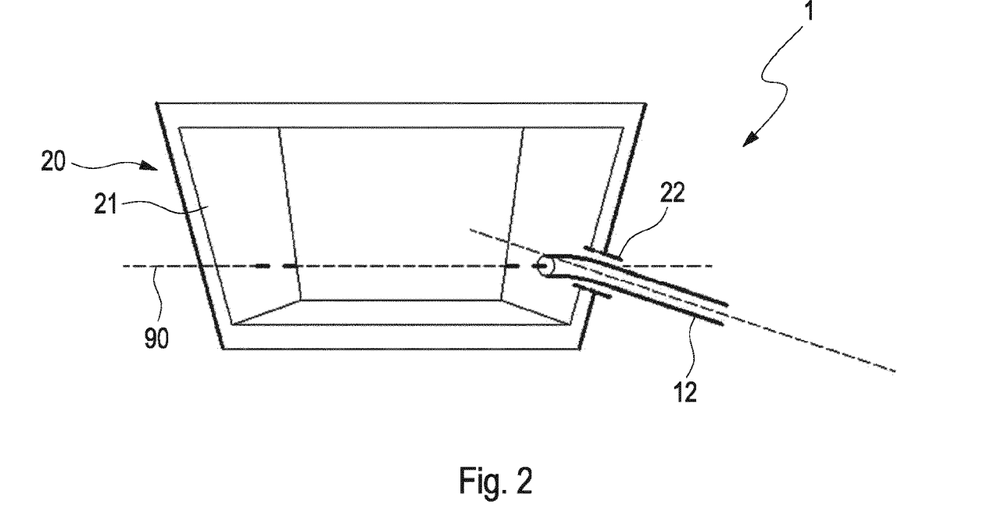
FIG. 2 shows a schematic view in section of FIG. 1.

The use of an apparatus 1 for inspecting a technical device 20, namely the combustion chamber 21 of an aircraft engine, using a borescope is drawn in FIGS. 1 and 2. For reasons of clarity, only the combustion chamber 21 of the aircraft engine is illustrated here. The apparatus can, however, be used in particular in the situation in which the combustion chamber 21 is installed in an aircraft engine.

The apparatus 1 comprises a repeatedly plastically deformable, elongated carrier element 2 with a borescope head 3 at that end 2' which is introduced into the combustion chamber 21. The carrier element 2 is here a material composite tube comprising a core consisting of an aluminum strip wound lengthwise, an outer covering of polyethylene, and a protective film as a protective coating on the inner side. The guide tube 3 is here self-supporting or alternatively supports the borescope head 3 such that it fundamentally retains its shape achieved after a plastic deformation without any external influences.

The carrier element 2 is guided through a deforming unit 10, the precise design of which will be described in greater detail below in different embodiments with the aid of FIGS. 3 and 4. The carrier element 2 is deformed in the deforming unit 10 by being bent and twisted in a controlled manner by a control apparatus 11 before it is extracted at the outlet end 12 of the deforming unit 10 and is introduced into the combustion chamber 21. To do this, the carrier element 2, in a curved guide tube 4 fastened detachably at the outlet end 12, is introduced through an inspection opening 12 into the combustion chamber 21 and is actually self-supporting beyond the point which is defined by the free end 4' of the guide tube 3 and can be reached again reproducibly. The reproducibility is here in particular also achieved by the fastening mechanism 6 by means of which the apparatus 1 is fastened in a clearly defined position and situation relative to the inspection opening 22 on the technical device 20.

The borescope head 3 is rigidly connected to the carrier element 2 and comprises image capture sensors for capturing digital 2D images such that a video borescope ultimately results. Integrated into the borescope head 3 is a probe unit 5 by means of which the position and orientation of the borescope head 3 can be calculated. The information obtained by the probe unit 5 is made available to the control apparatus 11 and fed into the control system of the deforming unit 10 such that it can be ensured that the borescope head 3 moves fundamentally along a predetermined path 90 when the carrier element 2 is pushed into the combustion chamber 21. If deviations from this path 90 are found, the control apparatus 11 can counteract them by suitable activation of the deforming unit 10.

Figure 3:
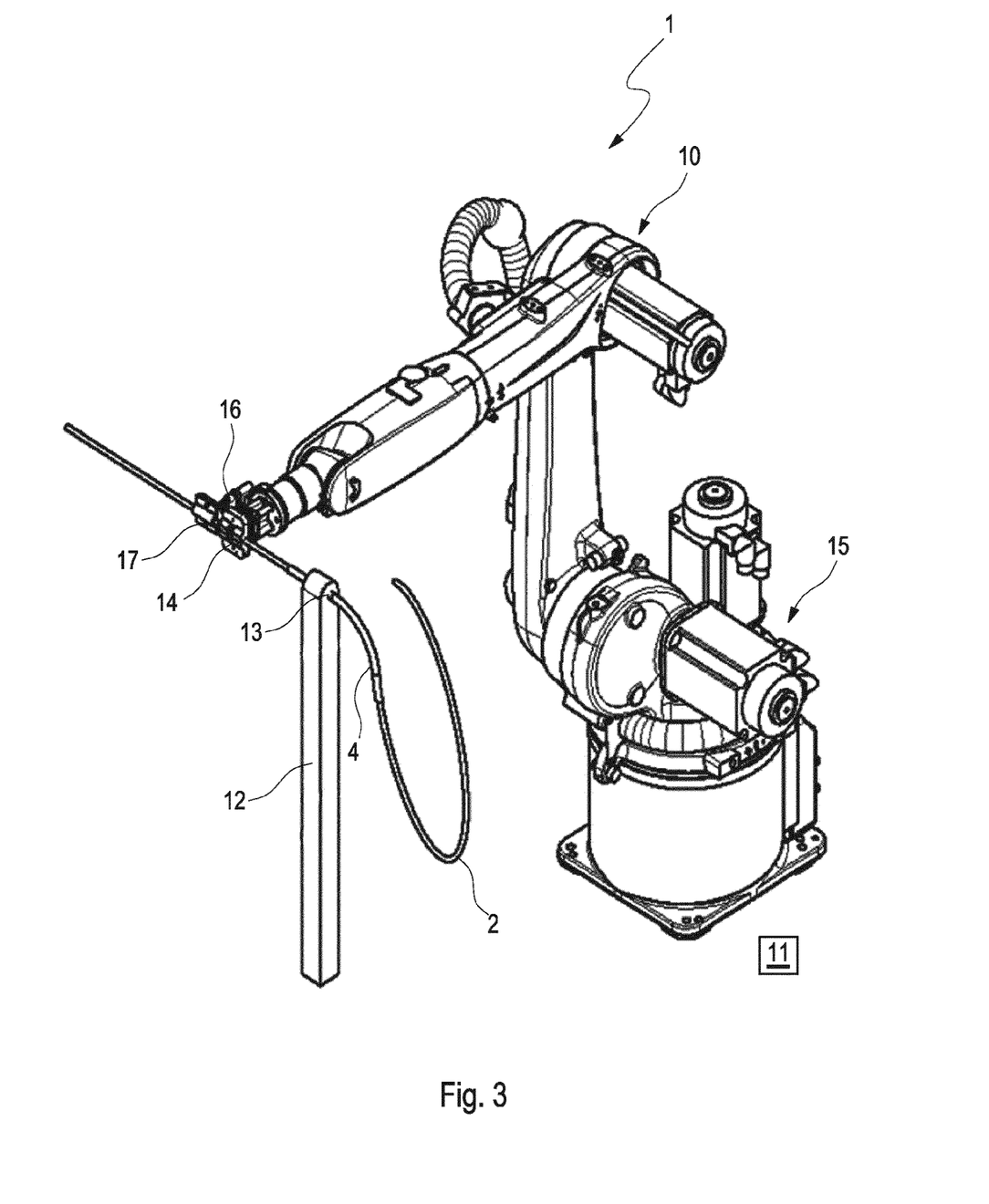
FIG. 3 shows a schematic illustration of a first embodiment of an apparatus according to the invention.

A first exemplary embodiment of an apparatus 1 as can be used, for example, in FIGS. 1 and 2 is illustrated in FIG. 3, wherein in particular the deforming apparatus 10 is also shown in detail.

The deforming unit 10 comprises a stationary guide element 13 which inter alia forms the outlet end 12 at which a guide tube 4 is also arranged in this exemplary embodiment. The carrier element 2 is guided axially in the guide element 13 along a defined axis. The carrier element 2 is here configured as a tube through which a separate flexible borescope can be guided.

An actuator element 14, which is arranged on the boom arm of a six-axis jointed-arm robot 15, is furthermore provided. The actuator element 14 is likewise designed to axially guide the carrier element 2 and has a locking means in the form of a two-finger gripper 16 by means of which the position and situation of the carrier element 2 relative to the actuator element 14 can be fixed in a controllable fashion.

A feed mechanism 17, by means of which the carrier element 2 is fed to the actuator element 14 on the side remote from the guide element 13, is immediately adjacent to the actuator element 14 and likewise on the boom arm of the jointed-arm robot 15.

By virtue of the six-axis jointed-arm robot 15, the actuator element 14 can be moved in almost any fashion relative to the guide element 13, in particular in and transversely to the direction of the gap between the stationary guide element 12 and the actuator element 14 in order to be able to apply both bending moments and twisting moments to the carrier element 2 in the region between the guide element 12 and the actuator element 14. By means of suitable temporary locking with the two-finger gripper 16 and corresponding movement of the actuator element 14 using the jointed-arm robot 15, the carrier element 2 can be pushed little by little out of the outlet end 12 of the deforming unit 10 and hence pushed into the technical device 20 to be inspected using a borescope (cf FIGS. 1 and 2).

The jointed-arm robot 15 can be controlled by the control mechanism 11, optionally taking into account the positional and situational information of a probe unit 5 (cf FIG. 1), such that the carrier element 2 is gradually pushed out of the deforming apparatus 10 and the shape of the carrier element 2 shown here in FIG. 3 by way of example results.

A second exemplary embodiment of an apparatus 1, as can be used, for example, in FIGS. 1 and 2, is illustrated in FIG. 4a, b in a side view and a perspective view.

In spite of the at first glance large differences from the exemplary embodiment according to FIG. 3, the two exemplary embodiments are based on the same inventive concept and hence reference should be made to the above designs for further information.

The deforming unit 10 shown in FIG. 4a, b comprises a stationary guide element 13 which forms the outlet end 12 of the deforming unit 10 and enables a guide tube 4 to be fastened detachably thereon.

The actuator element 14 is arranged, to axially fix the carrier element 2 and with a locking means in the form of a two-finger gripper 16, on a hexapod robot 15' which can be controlled by the control apparatus 11 such that the position and situation of the actuator element 14 in particular relative to the guide element 13 can be modified such that, inter alia, bending deformations of a carrier element 2 guided by the guide element 12 and the actuator element 14 can be obtained.

Figure 4:
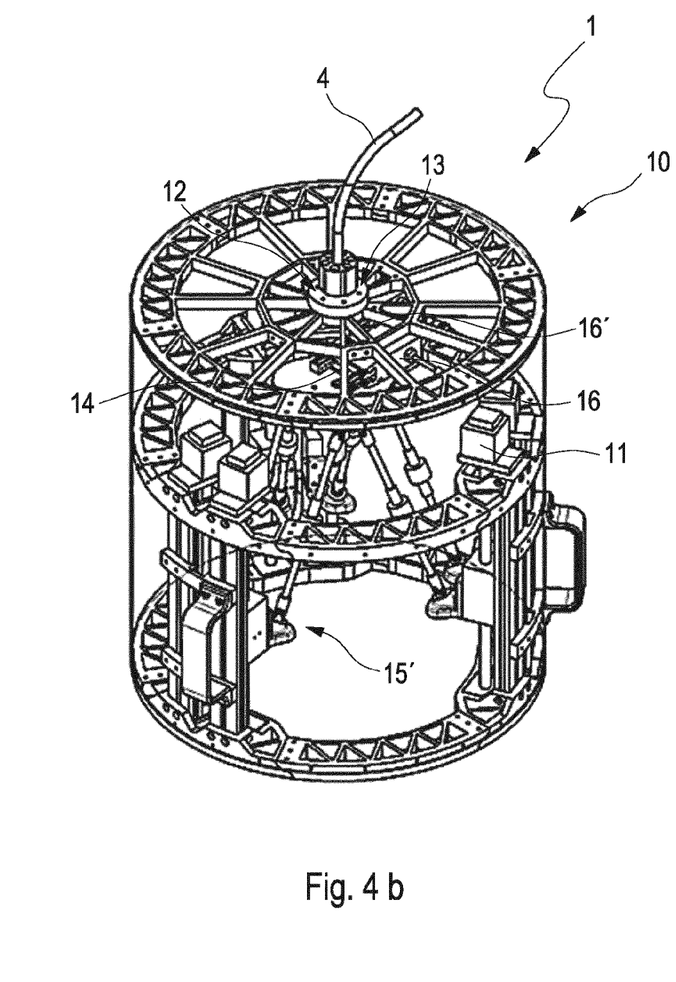
FIG. 4a and FIG. 4b show a schematic illustration of a second embodiment of an apparatus according to an aspect of the present disclosure.

In the case of the deforming mechanism 10 in FIG. 4, a locking apparatus in the form of a two-finger gripper 16' is also provided on the guide element 13. If a carrier element 2 is locked by both locking devices 16, 16' both in the guide element 12 and in the actuator element 14, twisting moments can be imparted to the carrier element 2 by suitable activation of the hexapod robot 15'. In the case of alternating locking in the locking apparatuses 16, 16', a carrier element 2 can be pushed little by little out of the outlet opening 12 of the deforming unit 10.

The embodiment of the deforming unit 10 in FIG. 4a, b is light enough to be carried by a person and has handles 18 so that it can be handled easily. Also because of the low weight, the deforming unit 10 can be fastened without any problem in any desired situation on a technical device 20 to be inspected using a borescope, such as, for example, an aircraft engine as drawn, for example, in FIG. 1.

Figure 5:
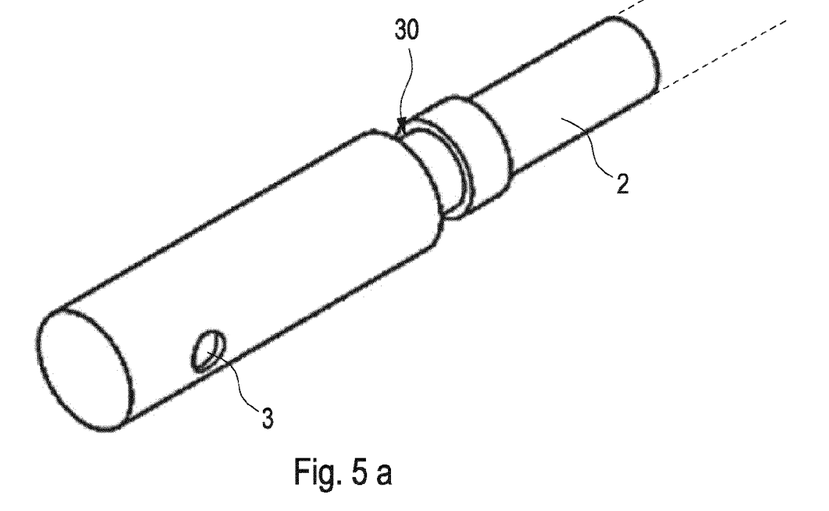
FIG. 5a and FIG. 5b show a schematic illustration of alternative embodiments of borescope heads rigidly connected to the carrier element.

If the borescope lens 5, as drawn in FIG. 1, is arranged rigidly on the carrier element 3, in order not to be restricted in terms of the orientation of the recording cone of the borescope head 3, the connection in question can have a degree of freedom of rotational movement about the axis of the carrier element 2, wherein the swiveling of the borescope head 3 about this axis by a suitable drive. A corresponding design with a driven swivel joint 30 and image capture sensors as the borescope lens is illustrated in FIG. 5a.

Alternatively, a plurality of image capture sensors can be provided as the borescope head 3 and arranged so that they are distributed radially for the purpose of capturing a 360° panoramic view. In this case, a swivel joint 30 can be omitted (cf FIG. 5b).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for inspecting a technical device using a borescope, the apparatus comprising:
   a repeatedly plastically deformable and elongated carrier which is guidable in a deforming unit, wherein the deforming unit comprises:
      a stationary guide configured to axially guide the carrier at an outlet end; and
      an actuator which is configured to axially guide the carrier, and is configured to move in at least one direction perpendicular to the gap between the guide and the actuator in order selectively to apply a bending moment to the carrier guided by the guide and the actuator, and
   wherein a borescope head is arranged at that end of the carrier which protrudes from the outlet end of the deforming unit.

2. The apparatus as claimed in claim 1, wherein the actuator is designed to selectively apply a twisting moment to the carrier.

3. The apparatus as claimed in claim 1, wherein the actuator and/or the stationary guide comprises a controllable lock for selectively fixing the position and/or the angular situation of the carrier in the actuator and/or the guide, wherein the lock is configured as a two-finger gripper.

4. The apparatus as claimed in claim 1, wherein the actuator is moveable in the direction of the gap between the stationary guide and the actuator.

5. The apparatus as claimed in claim 1, wherein the guide and/or the actuator comprise guide rollers for the carrier.

6. The apparatus as claimed in claim 1, wherein a guide tube, protruding from the deforming unit, for the passage of the carrier is fastened.

7. The apparatus as claimed in claim 1, comprising a feed mechanism by which the carrier is configured to be fed in a defined manner to the actuator on a side remote from the guide, wherein the feed mechanism is fixed relative to the guide or moved together with the actuator.

8. The apparatus as claimed in claim 1, wherein the carrier comprises a probe in a region of the borescope head for determining a position and/or orienting the borescope head.

9. The apparatus as claimed in claim 1, further comprising a controller configured to control components of the deforming unit, taking into account positional and/or orientation information of the borescope head obtained via a probe or by the borescope head.

10. The apparatus as claimed in claim 1, wherein the borescope head is rigidly connected to the carrier or is part of a flexible borescope which is guidable through a channel in the carrier.

11. The apparatus as claimed in claim 1, wherein the actuator comprises a six-axis jointed-arm robot and/or a hexapod robot, wherein the position and/or situation of the axial guidance of the actuator is modifiable by the robot.

12. The apparatus as claimed in claim 1, wherein the carrier is a material composite tube, comprising a core consisting of an aluminum strip and/or wound lengthwise, with a plastic covering and/or a protective coating on the inside.

13. The apparatus as claimed in claim 1, wherein the borescope head comprises an image capture unit as part of a video borescope and/or the technical device is a gas turbine or an aircraft engine.

14. The apparatus as claimed in claim 1, wherein the actuator comprises:
   a robot, which is a six-axis jointed-arm robot and/or a hexapod robot, wherein the position and/or situation of the axial guidance of the actuator is modifiable by the robot,
   a two-finger gripper configured as a controllable lock that is controllable to selectively fix a position or an angular situation of the carrier in the actuator, the two-finger gripper being at a distal end of the robot,
wherein the robot is configured to move a portion of the carrier relative to the stationary guide such that a bending or twisting moment is applied to the carrier in a region between the stationary guide element and the two-finger gripper.

15. A method for inspecting a technical device using a borescope, the method comprising selectively pre-deforming a repeatedly plastically deformable and elongated carrier with a borescope head, during insertion into the technical device, at its end which is to be inserted into the technical device in the region before entry into the technical device, in order thus to follow a predetermined path of the borescope head inside the technical device.

16. The method as claimed in claim 15, wherein the pre-deformation comprises bending and twisting deformation.

17. The method of claim 15, wherein the repeatedly plastically deformable and elongated carrier is guided in a deforming unit, wherein the deforming unit comprises:
   a stationary guide configured to axially guide the carrier at an outlet end; and
   an actuator, which is configured to axially guide the carrier, and configured to move in at least one direction perpendicular to the gap between the guide and the actuator in order to apply selectively a bending moment to the carrier guided by the guide and the actuator, and
wherein the borescope head is arranged at that end of the carrier which protrudes from the outlet end of the deforming unit.

* * * * *